United States Patent

Quin

[11] Patent Number: 5,877,450
[45] Date of Patent: Mar. 2, 1999

[54] ELECTRICAL COVER PLATE BOX

[76] Inventor: Nancy Quin, 26 Douglas Ave., Staten Island, N.Y. 10310

[21] Appl. No.: 935,715

[22] Filed: Sep. 23, 1997

[51] Int. Cl.⁶ ..................................................... H02G 3/14
[52] U.S. Cl. ............................................. 174/66; 220/242
[58] Field of Search .................................. 174/66, 67, 50, 174/48, 65 R; 220/241, 242, 3.8, 3.2, 4.02; 312/321.5; 361/832, 837

[56] References Cited

U.S. PATENT DOCUMENTS

| | | | |
|---|---|---|---|
| 3,518,356 | 6/1970 | Friedman | 174/66 |
| 3,752,900 | 8/1973 | Harrison et al. | 174/52.1 |
| 3,953,933 | 5/1976 | Goldstein | 40/642.02 |
| 4,009,797 | 3/1977 | Lee | 220/242 |
| 4,433,204 | 2/1984 | Wuertz | 174/48 |
| 4,512,168 | 4/1985 | Reitze | 70/456 R |
| 4,605,817 | 8/1986 | Lopez | 174/67 |
| 4,652,696 | 3/1987 | Winnick | 174/67 |
| 4,873,396 | 10/1989 | Guity-Mehr | 174/66 |
| 4,908,733 | 3/1990 | Zachrei et al. | 361/356 |
| 5,218,169 | 6/1993 | Riceman | 174/67 |
| 5,245,507 | 9/1993 | Erickson | 361/641 |
| 5,251,782 | 10/1993 | Crosby et al. | 221/2 |
| 5,347,427 | 9/1994 | Kinoshita | 361/752 |
| 5,558,209 | 9/1996 | Mohsen | 200/43.22 |

FOREIGN PATENT DOCUMENTS

| | | | |
|---|---|---|---|
| 968882 | 6/1975 | Canada | 174/66 |

*Primary Examiner*—Dean A. Reichard
*Assistant Examiner*—Dhiru R Patel
*Attorney, Agent, or Firm*—Richard L. Miller, P. E.

[57] ABSTRACT

An electrical cover plate box for mounting to a surface having a decor and replacing a conventional electrical cover plate covering at least one electrical device in the surface, while maintaining contents of the electrical cover plate box secure. The electrical cover plate box includes a box having a main portion for mounting to the surface, a lid portion hingedly attached to the main portion of the box, and maintaining apparatus for maintaining the box closed and maintaining its contents secure.

6 Claims, 1 Drawing Sheet

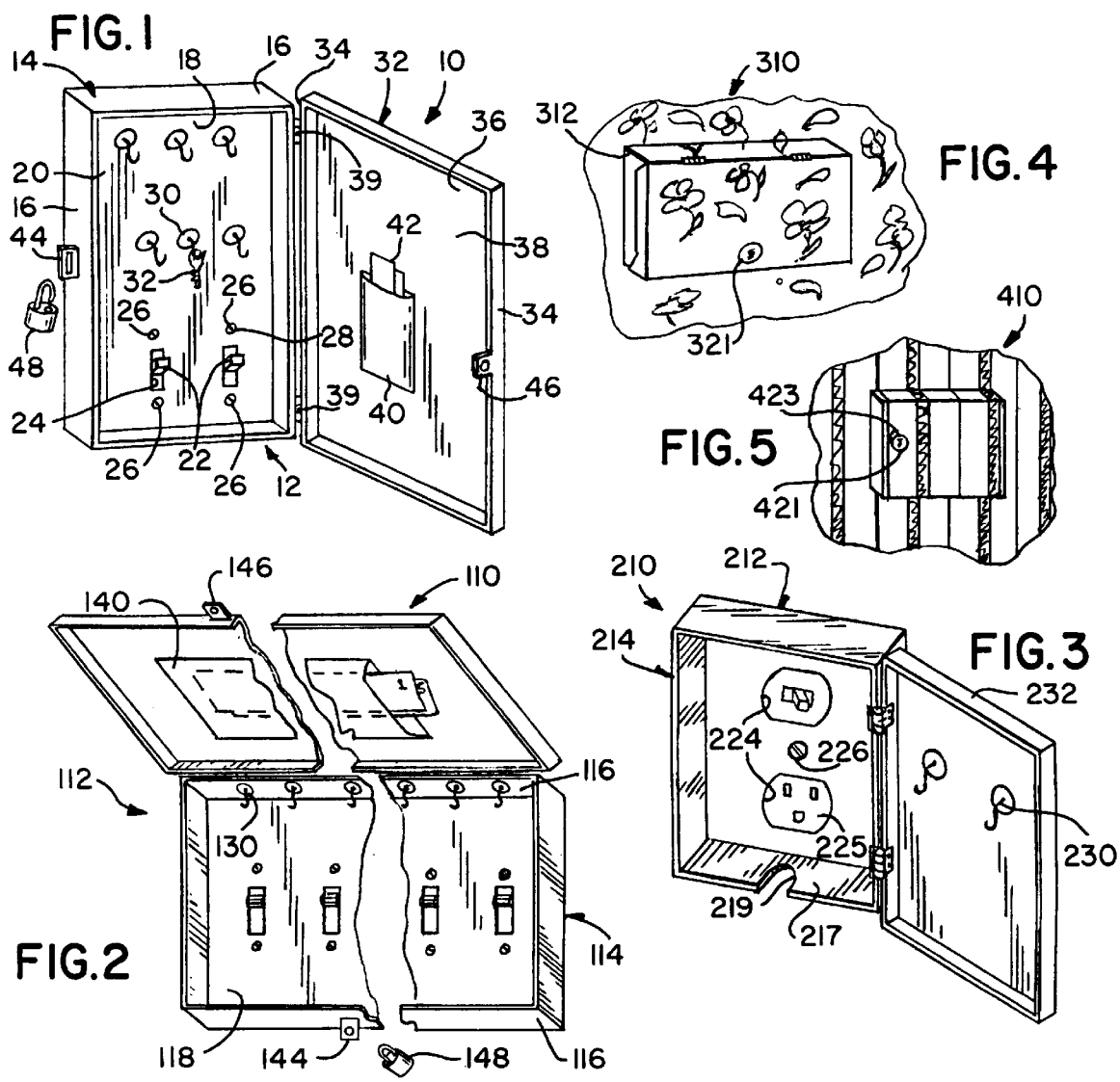

ELECTRICAL COVER PLATE BOX

BACKGROUND OF THE INVENTION

1. Field of the Invention

The present invention relates to a box. More particularly, the present invention relates to an electrical cover plate box.

2. Description of the Prior Art

Numerous innovations for electrical cover plates have been provided in the prior art that will be described. Even though these innovations may be suitable for the specific individual purposes to which they address, however, they differ from the present invention.

FOR EXAMPLE, U.S. Pat. No. 3,518,356 to Friedman teaches a switch plate cover attached to the two screws provided on standard American wall switch plates on opposite sides of the switch actuating member, approximately 2½ apart. The cover has two fixed brackets on its inner face for receiving the screw heads, and the screw shanks project through U-shaped notches in the brackets which are open in a common direction. The switch actuating member projects through a slot centered in the otherwise imperforate cover between the brackets. A raised edge of the cover is contiguously adjacent the wall.

ANOTHER EXAMPLE, U.S. Pat. No. 4,873,396 to Guity-Mehr teaches a cover plate having a back surface defining a covered M groove. The cover plate M groove is hooked over one screw of an electrical wiring device. The second screw then screws into the cover plate and sits deep in the cover plate screw groove. A decorative cover or plug then covers the second screw, so that no screw shows on the front surface farthest from the wall after installation and the cover plate is securely coupled to the wall by the installation of only one mounting screws, rather than two as required by prior art cover plates.

STILL ANOTHER EXAMPLE, U.S. Pat. No. 4,908,733 to Zachrei et al. teaches a switch box for wall attachment with a box-like cabinet body having a rear wall and four side walls, the open side of which body can be closed by a cabinet cover or a cabinet door. Using thin starting materials for the cabinet body, an increase of stability, in addition to the possibility of further attachment locations, can be attained by attaching a mounting angle in each of four corner areas on the internal side of the rear wall. The legs of the mounting angle, provided with threaded mounts, are positioned in a plane parallel to the rear wall and spaced at a distance therefrom. At least one external longitudinal side of a leg is provided with a recess for fixing a support strip which is firmly screwed in the area of the open side of the cabinet body. At least one threaded mount of every mounting angle is accessibly by a boring in the rear wall of the cabinet body.

YET ANOTHER EXAMPLE, U.S. Pat. No. 5,347,427 to Kinoshita teaches a cabinet assembly comprising a cabinet, a main wiring board provided with a control circuit and disposed within the cabinet, switches for controlling the control circuit, and keys for operating the switches, capable of being pushed from outside the cabinet. To eliminate restrictions placed by the keys and a light emitting diode for indicating actions of the control circuit on the design of the cabinet, to simplify the construction of the cabinet assembly and to facilitate cabinet assembly assembling work, the switches and the light emitting element are mounted on the main wiring board, the keys are formed and disposed so that the key top of each key form a portion of the external shape of the cabinet, each key is provided integrally with an actuating rod for operating the corresponding switch, and the light emitted by the light emitting element is transmitted by a light transmitting member to a portion of the wall of the cabinet or to the key top of the pushed key.

FINALLY, STILL YET ANOTHER EXAMPLE, U.S. Pat. No. 5,558,209 to Mohsen teaches a switch lockout for preventing movement of a switch arm which projects through an opening in a switch face plate and pivots about a transverse ON-OFF axis, of either a conventional wall-type electrical rocker or a convention wall-type toggle switch, comprises a mounting frame parallel to the switch face plate that includes a side wall of octagonal shape integrally attached to a planar end wall located—in operations—in a position parallel to the switch face plate. The end wall has a continuous edge integrally attached to the side wall to form a box-like interior cavity and a central aperture extending orthogonally therethrough, and a cover frame pivotally attached to the mounting frame along a transverse pivot axis parallel to the transverse ON-OFF axis of the switch arm. The cover frame includes a side wall of octagonal shape integrally attached to an end wall that is bulbously shaped in its mid-region to define separate up-ramp and down-ramp segments that attach between co-planar first and second end segments. In operations, either the counterbore segment of the mounting frame or the up-ramp segment of the cover frame are used to create "stops" when the cover frame is placed in a closed state relative to the mounting frame, such "stops" limiting movement of the switch arm irrespective of type of switch assembly used, and irrespective of the ON-OFF operative state of the switch arm.

It is apparent that numerous innovations for electrical cover plates have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an electrical cover plate box that avoids the disadvantages of the prior art.

ANOTHER OBJECT of the present invention is to provide an electrical cover plate box that is simple and inexpensive to manufacture.

STILL ANOTHER OBJECT of the present invention is to provide an electrical cover plate box that is simple to use.

BRIEFLY STATED, YET ANOTHER OBJECT of the present invention is to provide an electrical cover plate box for mounting to a surface having a decor and replacing a conventional electrical cover plate covering at least one electrical device in the surface, while maintaining contents of the electrical cover plate box secure. The electrical cover plate box includes a box having a main portion for mounting to the surface, a lid portion hingedly attached to the main portion of the box, and maintaining apparatus for maintaining the box closed and maintaining its contents secure.

The novel features which are considered characteristic of the present invention are set forth in the appended claims. The invention itself, however, both as to its construction and it method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view of a first embodiment of the present invention;

FIG. 2 is a diagrammatic perspective view of a second embodiment of the present invention;

FIG. 3 is a diagrammatic perspective view of a third embodiment of the present invention;

FIG. 4 is a diagrammatic perspective view of a fourth embodiment of the present invention; and FIG. 5 is a diagrammatic perspective view of a fourth embodiment of the present invention.

LIST OF REFERENCE NUMERALS UTILIZED IN THE DRAWING

First Embodiment 10 electrical cover plate box of the present invention
11 surface
12 box
14 main portion of box 12
16 pair of opposing long walls of main portion 14 of box 12
18 open front of main portion 14 of box 12
20 rear wall of main portion 14 of box 12
22 at least one electrical switch
24 at least one throughslot in rear wall 20 of main portion 14 of box 12
26 hole above and below each throughslot of at least one throughslot 24 in rear wall 20 of main portion 14 of box 12
28 cover plate screws
30 optional at least one key hook 30 on rear wall 20 of main portion 14 of box 12
32 at least one key
32 lid portion of box 12
34 pair of opposing long walls of lid portion 32 of box 12
36 open front of lid portion 32 of box 12
38 rear wall of lid portion 32 of box 12
39 hinges
40 optional pouch on rear wall 38 of lid portion 32 of box 12
42 papers held in optional pouch 40 on rear wall 38 of lid portion 32 of box 12
44 first padlock staple extending outwardly from other long wall of pair of opposing long walls 16 of main portion 14 of box 12
46 second padlock staple extending outwardly from other long wall of pair of opposing long walls 34 of lid portion 32 of the box 12
48 padlock 48 passing through first padlock stable 44 and second padlock stable 46

Second Embodiment 110 electrical cover plate box of the present invention
112 box
114 main portion of box 112
116 pair of opposing long walls of main portion 114 of box 112
130 optional at least one key hook extending from one long wall of pair of opposing long walls 116 towards other long wall of pair of opposing long walls 116 of main portion 114 of box 112
140 optional pouch

Third Embodiment 210 electrical cover plate box of the present invention
212 box
214 main portion of box 212
224 at least one throughslot
225 at least one electrical outlet
226 hole between at least one electrical outlet 225
230 optional at least one key hook
217 lowermost short wall of main portion 214 of box 212
219 notch in lowermost short wall 217 of main portion 214 of box 212
232 lid portion of box 212

Fourth Embodiment 310 electrical cover plate box of the present invention
312 box
321 key lock

Fifth Embodiment 410 electrical cover plate box of the present invention
414 box
421 key lock in handle 423
423 handle

DETAILED DESCRIPTION OF THE PREFERRED EMBODIMENT

Referring now to the figures in which like numerals indicate like parts, and particularly to FIG. 1, a first embodiment of the electrical cover plate box of the present invention is shown generally at 10 for mounting to a surface 11 having a decor and replacing a conventional electrical cover plate (not shown) covering at least one electrical device in the surface 11, while maintaining its contents secure.

The electrical cover plate box 10 includes a box 12 that is vertically-oriented, hollow, and rectangular-parallelepiped-shaped.

The box 12 has a main portion 14 for mounting to the surface 11 and replacing the conventional electrical cover plate (not shown).

The main portion 14 of the box 12 is vertically-oriented, hollow, and rectangular-parallelepiped-shaped, and has a pair of opposing long walls 16 that are vertically-oriented, an open front 18, and a rear wall 20 for overlying at least one electrical switch 22 and functioning as a cover plate therefor.

The rear wall 20 of the main portion 14 of the box 12 has at least one throughslot 24 therein that is vertically-oriented and horizontally spaced-apart when more than one.

Each throughslot of the at least one throughslot 24 in the rear wall 20 of the main portion 14 of the box 12 receives a respective electrical switch of the at least one electrical switch 22, and has a hole 26 above and below it for receiving cover plate screws 28 for screwing into the respective electrical switch of the at least one electrical switch 22 in a manner similar to that of the conventional switch plate.

The rear wall 20 of the main portion 14 of the box 12 further has an optional at least one key hook 30 thereon for holding at least one key 32, and which extends towards the open front 18 of the main portion 14 of the box 12.

The box 12 further has a lid portion 32 that is hollow, rectangular-parallelepiped-shaped, and vertically-oriented, and has a pair of opposing long walls 34, an open front 36, and a rear wall 38.

One long wall of the pair of opposing long walls 34 of the lid portion 32 of the box 12 is hinged, by hinges 39, to one long wall of the pair of opposing long walls 16 of the main portion 14 of the box 12, with the lid portion 32 of the box 12 selectively opening and closing the main portion 14 of the box 12, and with the open front 36 of the lid portion 32 of the box 12 facing the open front 18 of the main portion 14 of the box 12 when the box 12 is closed.

The rear wall 38 of the lid portion 32 of the box 12 has an optional pouch 40 thereon for holding paper 42 therein, and which is vertically-oriented.

The other long wall of the pair of opposing long walls 16 of the main portion 14 of the box 12 has extending outwardly therefrom a first padlock staple 44, while the other long wall of the pair of opposing long walls 34 of the lid portion 32 of the box 12 has extending outwardly therefrom a second padlock staple 46 that is aligned with the first padlock stable 44 when the box 12 is closed, with the box 12 being maintained closed by a padlock 48 passing through the first padlock stable 44 and the second padlock stable 46 so as to allow the at least one electrical switch 22, the at least one key 32, and the papers 42 contained in the box 12 to be secure.

The configuration of a second embodiment of the electrical cover plate box 110 can best be seen in FIG. 2, and as such will be discussed with reference thereto.

The electrical cover plate box 110 is similar to the electrical cover plate box 10, except for the following differences:
1. The box 112 is horizontally-oriented;
2. The pair of opposing long walls 116 of the main portion 114 of the box 112 are horizontally-oriented;
3. The optional at least one key hook 130 extends from the one long wall of the pair of opposing long walls 116 towards the other long wall of the pair of opposing long walls 116 of the main portion 114 of the box 112; and
4. The optional pouch 140 is horizontally-oriented.

The configuration of a third embodiment of the electrical cover plate box 210 can best be seen in FIG. 3, and as such will be discussed with reference thereto.

The electrical cover plate box 210 is similar to the electrical cover plate box 10, except for the following differences:
1. At least one throughslot of the at least one throughslot 224 is for receiving an electrical outlet 225, and when the at least one throughslot 224 is more than one throughslot, they are vertically spaced-apart, with the hole 226 being disposed therebetween;
2. The optional at least one key hook 230 replaces the optional pouch 40 so as not to interfere with an electrical cord (not shown) that is plugged into the electrical outlet 225; and
3. A lowermost short wall 217 of the main portion 214 of the box 212 has a notch 219 therein for nesting the electrical cord (not shown) that is plugged into the electrical outlet 225 so as to prevent the lid portion 232 of the box 212 from cutting into it when it is closed.

The configuration of a fourth embodiment of the electrical cover plate box 310 can best be seen in FIG. 4, and as such will be discussed with reference thereto.

The electrical cover plate box 310 is similar to the electrical cover plate box 110, except for the following differences:
1. The exterior of the box 312 is decorated to match the decor of the surface on which it is mounted; and
2. The first padlock stable 144, the second padlock stable 146, and the padlock 148 are replaced by a key lock 321.

The configuration of a fifth embodiment of the electrical cover plate box 410 can best be seen in FIG. 5, and as such will be discussed with reference thereto.

The electrical cover plate box 410 is similar to the electrical cover plate box 310, except that the key lock 421 is in a handle 423 for facilitating opening of the box 414.

It will be understood that each of the elements described above, or two or more together, may also find a useful application in other types of constructions differing from the types described above.

While the invention has been illustrated and described as embodied in an electrical cover plate box, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An electrical cover plate box, comprising a box having:
a) a main portion said main portion of said box being for mounting to a surface having a decor and replacing a conventional electrical cover plate covering at least one electrical device in the surface; said main portion of said box being hollow and rectangular-parallelepiped-shaped and having a pair of opposing long walls, an open front, and a rear wall for overlying the at least one electrical device and functioning as a cover plate therefor; said rear wall of said main portion of said box having at least one throughslot therein; said box being vertically-oriented; said main portion of said box being vertically-oriented; the at least one electrical device is at least one electrical switch; said at least one throughslot in said rear wall of said main portion of said box being more than one throughslot being horizontally spaced-apart; each throughslot of said at least one throughslot in said rear wall of said main portion of said box receiving a respective electrical device of the at least one electrical device; said rear wall of said main portion of said box further having at least one hole for receiving at least one cover plate screw for screwing into the respective electrical device of the at least one electrical device in a manner similar to that of the conventional switch plate; said at least one hole comprising one hole above and one hole below each throughslot of said at least one throughslot in said rear wall of said main portion of said box; said box having an exterior being decorated to match the decor of the surface on which it is mounted;
b) a lid portion hingedly attached to said main portion of said box; said lid portion of said box being vertically-oriented;
c) maintaining means for maintaining said box closed and maintaining its contents secure; said maintaining means including a key lock; said key lock being in a handle being disposed on said lid of said box for facilitating opening said box;
d) at least one key hook contained in said box for holding at least one key; said at least one key hook being on said rear wall of said main portion of said box and extending towards said open front of said main portion of said box; and
e) a pouch contained in said box for holding papers; said pouch being disposed on said rear wall of said lid portion of said box; said pouch being vertically-oriented.

2. The electrical cover plate box as defined in claim 1, wherein said lid portion of said box is hollow and rectangular-parallelepiped-shaped, and has a pair of opposing long walls, an open front, and a rear wall.

3. The electrical cover plate box as defined in claim 2, wherein one long wall of said pair of opposing long walls of said lid portion of said box is hinged, by hinges, to one long wall of said pair of opposing long walls of said main portion of said box, with said lid portion of said box selectively opening and closing said main portion of said box, and with said open front of said lid portion of said box facing said open front of said main portion of said box when said box is closed.

4. The electrical cover plate box as defined in claim 1, wherein said pair of opposing long walls of said main portion of said box are vertically-oriented.

5. The electrical cover plate box as defined in claim 3, wherein said maintaining means includes a first padlock staple extending outwardly from the other long wall of said pair of opposing long walls of said main portion of said box, a second padlock staple extending outwardly from the other long wall of said pair of opposing long walls of said lid portion of said box and being aligned with said first padlock staple when said box is closed, and a padlock passing through said first padlock staple and said second padlock staple.

6. The electrical cover plate box as defined in claim 1, wherein a lowermost short wall of said main portion of said box has a notch therein for nesting the electrical cord so as to prevent said lid portion of said box from cutting into the electrical cord when said box is closed.

\* \* \* \* \*